(12) United States Patent
Gordon

(10) Patent No.: US 6,795,058 B2
(45) Date of Patent: Sep. 21, 2004

(54) SMALL FACILE ERGONOMIC COMPUTER MOUSE

(75) Inventor: Gary B. Gordon, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 124 days.

(21) Appl. No.: 10/133,191

(22) Filed: Apr. 27, 2002

(65) Prior Publication Data

US 2003/0160766 A1 Aug. 28, 2003

Related U.S. Application Data

(63) Continuation-in-part of application No. 10/085,653, filed on Feb. 28, 2002.

(51) Int. Cl.[7] ................................................. G09G 5/08
(52) U.S. Cl. ....................................... 345/163; 345/157
(58) Field of Search ................................ 345/156, 157, 345/158, 159, 160, 163, 166, 167

(56) References Cited

U.S. PATENT DOCUMENTS

| | | | |
|---|---|---|---|
| 4,922,236 A | | 5/1990 | Heady |
| 5,428,368 A | * | 6/1995 | Grant .......................... 345/163 |
| 6,031,518 A | * | 2/2000 | Adams et al. ............... 345/156 |
| 6,043,807 A | | 3/2000 | Carroll |
| 6,151,015 A | | 11/2000 | Badyal et al. |
| 6,377,245 B1 | * | 4/2002 | Park ........................... 345/163 |
| 2003/0058219 A1 | * | 3/2003 | Shaw |

OTHER PUBLICATIONS

Hewlett–Packard, Installation and Setup Guide for OMNI-BOOK–1993.

* cited by examiner

*Primary Examiner*—Vijay Shankar
(74) *Attorney, Agent, or Firm*—Judy Liao Shie

(57) ABSTRACT

An ergonomic mouse has a small body that can be gripped in the fingers much like a writing implement or an eraser. A primary switch is located on an angled facet on the top of the mouse. The primary switch is activated by the user's first finger. By locating the primary switch on the angled facet, a user can access the switch without completely pronating the hand. A secondary switch is located on a side of the mouse, and activated by the user's thumb in a pinching motion between the thumb and second finger. The small size of the mouse allows a user to control it with more ease and facility. Due to its small size, an optical sensor is preferably used as the motion sensing mechanism in the mouse. By radically repositioning the secondary switch, the awkward movements used to activate switches in a conventional mouse are eliminated.

14 Claims, 2 Drawing Sheets

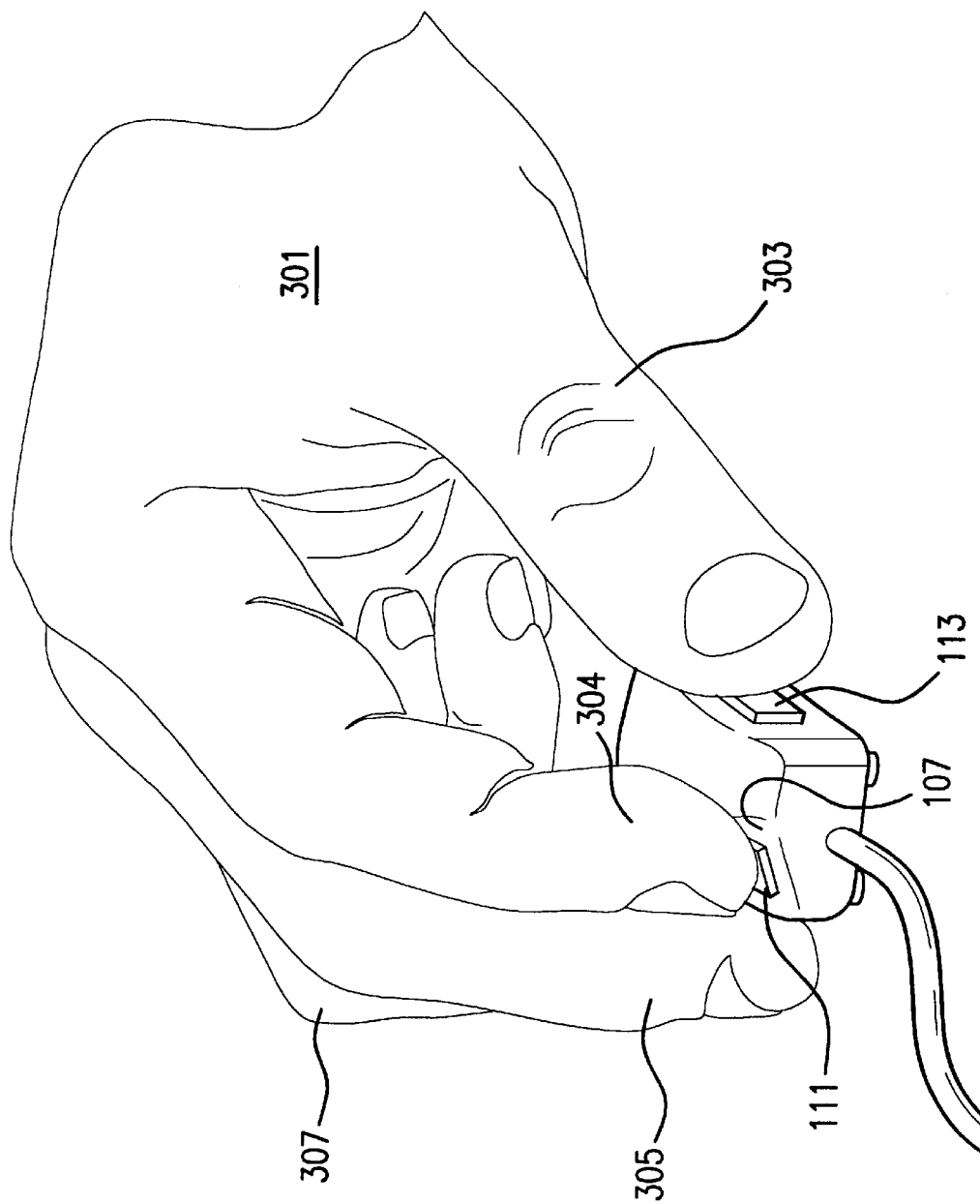

SMALL FACILE ERGONOMIC COMPUTER MOUSE

CROSS REFERENCE TO RELATED APPLICATION

This application is a continuation-in-part of U.S. patent application Ser. No. 10/085,653 by Gary Gordon, filed on Feb. 28, 2002, entitled "Facile Ergonomic Computer Pointing Device." The disclosure of co-pending application Ser. No. 10/085,653 is herein incorporated by reference.

FIELD OF THE INVENTION

The invention is directed towards the field of electronic circuitry, and more specifically, towards ergonomic input devices such as a computer mouse.

BACKGROUND OF THE INVENTION

Repetitive Strain Injuries (RSI) are a modern-day hazard in the computer-using workforce, and are a leading cause of occupational injuries in the United States today. Computer mouse usage is blamed for many of these injuries. A mouse is typically used as an input device that controls the movement of a cursor or other display element on a display screen. The conventional and most commonly used mouse resembles a bar of soap in shape and size. This "soap bar" mouse is designed such that a user's palm and fingers rest on the mouse body when moving the mouse or activating its buttons. A primary and a secondary switch are positioned on top of the mouse, adjacent to each other. The primary switch is activated by the first finger and the secondary switch is activated by the second finger. Unfortunately, this design requires the user's fingers to be splayed out over the mouse body and buttons, instead of being slightly curled in as is natural when the hand is relaxed. Furthermore, the hand is completely pronated (rotated so that the palm faces down, parallel to the desk top) while working the mouse. This unnatural position strains the tendons in the hand, and can be harmful especially when maintained for an extended period of time. A more natural and ergonomic position for the hand is one where the palm and wrist are 45° to 90° less twisted.

Another drawback to the conventional mouse is the awkward movements required to activate the switches. The primary switch on a conventional mouse is designed to be activated by a tap of the first finger in an up-down motion substantially perpendicular to the work surface. However, this requires the first finger to be flexed repeatedly while the hand is pronated and the first finger splayed out. This motion can strain the finger tendons. For example, when the primary switch is activated, the user must keep the second finger stationary in its outstretched and splayed position while the first finger presses down upon the primary switch. The reverse is also true: when the secondary switch is activated by the second finger, the user must hold the first finger still to prevent it from inadvertently activating the primary switch. This unnatural muscle restraint, especially among adjoining fingers, is uncomfortable and may also increase the risk of RSI.

The "soap bar" mouse typically uses a mechanical ball bearing mechanism to sense motion along the work surface. However, the mechanical ball bearing mechanism is physically large, requiring a mouse with housing large enough to contain it. The motion of the mouse is typically controlled by hand and arm muscles, which have relatively poor fine motor control. Therefore, a third drawback to the "soap bar" mouse is its unwieldy shape and relatively large size, which make it relatively difficult to control the mouse with the high degree of accuracy required by many Computer-Aided Design (CAD) tools.

Consequently, there remains a need for an ergonomic computer mouse that has accurate positioning capability and alternative methods for switch activation, while allowing a user's hand to remain in a natural, relaxed position. The ergonomic mouse should also support three modes of positioning determined by the inventor to be important for heavy mouse users such as users of CAD software: gross motions produced by moving the arm, finer motions produced by anchoring the hypothenar (the fleshy region of the palm under the little finger), and even finer motions produced by nudging the mouse using the fingers.

SUMMARY OF THE INVENTION

The general idea for the present invention was partially derived by observing the writing process, and in particular, the way one holds a pen or an eraser. (Exemplary erasers are Pink Pearl® or Magic Rub® erasers made by Sanford, or any other erasers having a size comparable to the present invention.) Writers use an inherently ergonomic hand position, hereinafter referred to as the writing position: the fingers remain curled, not splayed out; the hand is angled between 45 degrees and 90 degrees to the work surface, never completely pronated; and the hypothenar of the hand rests on the work surface. Additionally, the number of RSI cases associated with writing is relatively low, compared to the number of computer-related RSI cases. Therefore, it is logical and reasonable for an ergonomic mouse to recreate the hand positions and motions used in writing or holding an eraser.

In accordance with an illustrated preferred embodiment of the present invention, an ergonomic mouse has a small body designed to be gripped between the thumb, first finger, and the second finger of the hand, similar to how a writing implement or an eraser is held. This allows the hand and fingers to remain in the natural and relaxed writing position while the hypothenar rests on the work surface. The fingers rest curled inwards and close to each other, rather than being splayed uncomfortably across the mouse body as with conventional mice. The small size of the mouse serves primarily to facilitate dexterous use and control by the fingers, the same way one uses a pencil. Since deft finger muscles control the mouse, it is possible to position the mouse very accurately. Furthermore, the small size of the mouse is well suited to the limited amount of space associated with laptop computers. The small size of the mouse is made possible by using an optical sensor instead of a conventional mechanical ball bearing that takes up more space.

The primary switch, located on an angled facet of the mouse, is activated by the first finger. The angled facet allows the first finger remain curved while approaching the switch from a more natural angle. The angle of the facet may vary, but is preferably between 30 and 70 degrees to the vertical, and angled towards the upper right corner of the mouse. If the size of the facet allows, more than one switch may be located on the angled facet. The first finger rests on the facet while manipulating the mouse. The adjoining second finger grips one side of the mouse body in a curved position. Since the second finger is not positioned over a switch, there is no need to isolate its motion from that of the first finger. Depending on the size of the user's hand, there may also be enough room on the side of the mouse body to accommodate the third finger for extra grip control. A secondary switch is positioned on another side of the mouse body, opposite the side where the second finger rests. The secondary switch is activated by the thumb with a pinching motion between the thumb and the second finger (and possibly the third finger if space allows) resting on the side. This switch preferably requires a slightly higher actuation force than the primary switch, so that merely gripping the mouse will not cause it to be inadvertently activated.

Besides preventing RSI, the present invention also gives the users facile control of the mouse, by supporting three modes of positioning observed by the inventor: gross motions made by moving the arm, finer motions made by anchoring the hypothenar, and even finer motions made by nudging the mouse using the fingers.

Further features and advantages of the present invention, as well as the structure and operation of preferred embodiments of the present invention, are described in detail below with reference to the accompanying exemplary drawings. In the drawings, like reference numbers indicate identical or functionally similar elements.

BRIEF DESCRIPTION OF THE DRAWINGS

FIG. 3 is a sketch of how a user should grasp the ergonomic mouse of FIG. 1.

DETAILED DESCRIPTION

Figure 1:
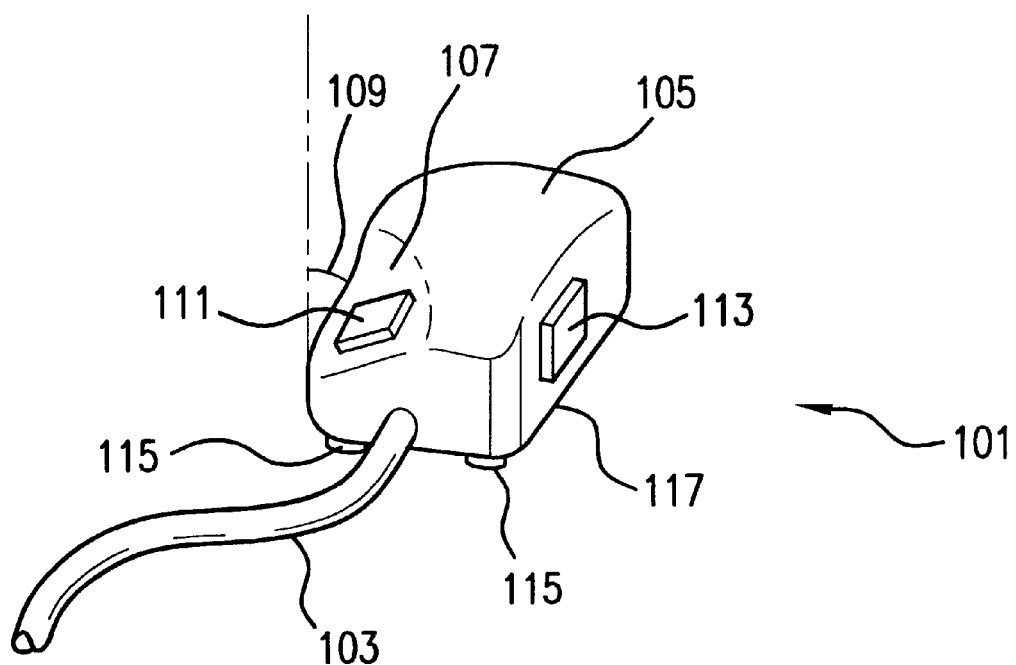
FIG. 1 shows a perspective view of a preferred embodiment of an ergonomic mouse, constructed in accordance with the present invention.

FIG. 1 shows a perspective view of a preferred embodiment of an ergonomic mouse 101, constructed in accordance with the present invention. Although not explicitly depicted in the figure, the ergonomic mouse 101 rests on a work surface, such as a desktop. The ergonomic mouse 101 controls the movement of a pointer, cursor, displayed element, or other object on the display screen of a computer or other instrument. As the ergonomic mouse 101 traverses the work surface, the movement of the ergonomic mouse 101 on the work surface corresponds with the movement of an object on the display screen. The ergonomic mouse 101 is shown in FIG. 1 to be attached to the computer by a cord 103, but the ergonomic mouse 101 can also communicate with the computer via a wireless link.

The mouse body 105 is small, preferably less than 33 cubic centimeters in volume. For illustrative purposes only, comfortable dimensions for the mouse have been determined to be approximately 2.5 cm wide, 4.5 cm long, and 1.5 cm high. The top of the body 105 preferably has a flat facet 107 that is at an angle 109 to the vertical. This angle 109 can be between 10° and 90°, preferably between 30° and 70°, and more preferably between 40 and 60 degrees.

A primary switch 111 is located on the facet 107, to be activated by the user's first finger. The primary switch 111 preferably has an actuation force between 1 and 2 ounces. The primary switch 111 is typically used to "pick" locations on the screen, where it is very important that the ergonomic mouse 101 remain stationary during the selection process. Since the force applied by the first finger to the primary switch 111 is generally a downward force against a stationary work surface, the primary switch 111 may be actuated without requiring compensating forces from other fingers. Thus, the ergonomic mouse 111 is unlikely to move while the primary switch 111 is activated.

A secondary switch 113 is located on the side of the body 105, to be activated by the user's thumb. The secondary switch 113 preferably requires a slightly higher actuation force, preferably more than 20% greater than the force required to activate the primary switch 111, so as to prevent inadvertent activation while the ergonomic mouse 101 is being moved. The secondary switch 113 is generally used to perform operations such as repeating the previous command, pulling up a menu, and other such functions where the position of the corresponding cursor on the display screen need not be precisely fixed. This fact is exploited by the present invention, which positions the secondary switch 113 on the side of the mouse. The secondary switch 113 is activated by a pinching action between the thumb and opposing finger(s). Because the force of the thumb against the side of the ergonomic mouse 101 is opposed only by the user's finger(s) rather than a stationary work surface (as is the case for the primary switch 111), the ergonomic mouse 101 may move slightly during activation of the secondary switch 113. However, such movement is not detrimental to the operation of the ergonomic mouse 101, since the previously described operations do not require that the ergonomic mouse 101 remain fixed in place during activation of the secondary switch 113. This knowledge about the functions performed by the secondary switch 113 frees up design constraints on the ergonomic mouse 101, allowing a tradeoff of positional stability in favor of ergonomics.

Although the figure illustrates only a single switch located on the facet 107, multiple switches may be located on the facet 107 if enough room is available. Both the primary switch 111 and secondary switch 113 can be axial pressure switches. Alternatively, the secondary switch may be any sensor capable of sensing a pinching force between the thumb and other fingers, such as a pressure-sensitive sensor capable of detecting a flexure in the mouse housing. The ergonomic mouse 101 has low-friction glide pads 115 on its base 117 to facilitate movement on the work surface. The low-friction glide pads 115 are optional.

Figure 2:
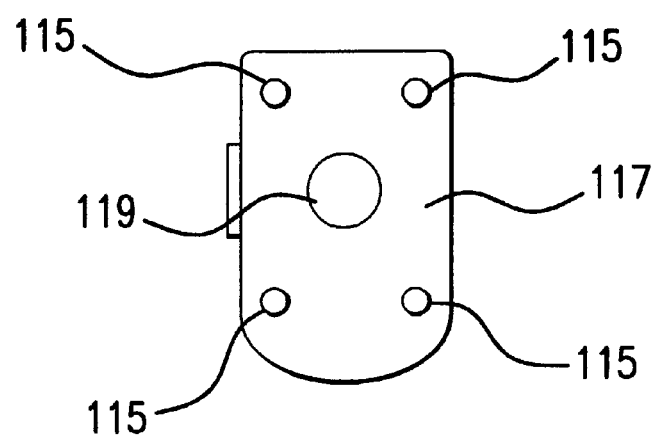
FIG. 2 is a bottom view of the ergonomic mouse.

FIG. 2 shows a bottom view of the base 117 of the ergonomic mouse 101. The position of the low friction glide pads 115 can be seen more clearly from this view. Low friction glide pads 115 are optional and can be left off of the base 117. Aperture 119 represents the general location of a relative motion sensor installed in the base 117. The relative motion sensor should be an optical sensor, although a mechanical ball bearing mechanism (such as the kind as used in conventional mice) may be used if the ball bearing mechanism is small enough to fit into the base 117 and body 105 of the ergonomic mouse 101.

FIG. 3 is a sketch of how a user's hand 301 should grasp the ergonomic mouse 101. The ergonomic mouse 101 is very small, typically less than 33 cubic centimeters in volume. The small size of the ergonomic mouse 101 allows it to be gripped between just the thumb 303, first finger 304, and the second finger 305 of the hand. If the size of the user's hand 301 is small enough, the third finger 307 may also be able to grip the ergonomic mouse 101. The hand 301 and fingers remain in the natural and relaxed writing position, and move the ergonomic mouse 101 like a writing implement or an eraser. The width of the ergonomic mouse 101 is preferably less than four centimeters, to avoid spreading the thumb 303 and fingers unduly.

Since the primary switch 111 lies on a facet 107 at a natural angle, it is easily accessible by the first finger 304—there is no need for the user's hand 301 to be completely pronated when reaching for and activating the primary switch 111. The secondary switch 113 lies under the thumb 303, and is activated by a slight pinching motion between the thumb 303 and second finger 305. By positioning the switches under a thumb 303 and first finger 304 instead of adjoining fingers, the user's comfort level when actuating the switches is increased.

The ergonomic mouse 101 is designed to be held and moved like a writing implement or an eraser. There are three primary motion mechanisms used when manipulating the ergonomic mouse 101: a gross motion, an intermediate motion, and a fine motion. The gross motion is used when relatively large distances are to be traveled by the pointer on the corresponding display screen. The user grasps the ergonomic mouse 101 in the fingers, and then slides the hypothenar along the work surface, exerting primarily just the arm muscles. The contact of the hypothenar to the work surface provides tactile feedback to the user as the ergonomic mouse 101 is moved. Writers make similar gross motions when they reorient the hand between one word and the next, or between the end of one line and the beginning of the next.

The intermediate motion is used when smaller distances need to be covered on the corresponding display screen, or when more precision and accuracy is desired from the ergonomic mouse 101. First, the hypothenar is anchored in place to stabilize the hand. Then, using the dexterous finger muscles, the user can control the ergonomic mouse 101 with great accuracy to pinpoint a desired location on the corresponding display screen. The corresponding writing analogy is the motion of forming and connecting the letters within a word.

A third and finer motion is used to select very small objects on the display screen, or to move the cursor a very small distance. Since cursor movements are often scaled to be ten times the actual mouse movements, expecting the user to move the mouse a distance of 0.1 mm or less is not unreasonable. Such motions are accomplished with the hypothenar anchored on the work surface. By nudging the mouse, shifting the fingers against the work surface in minute increments while holding the mouse, a user can move the mouse a mere fraction of a millimeter.

Although the present invention has been described in detail with reference to particular preferred embodiments, persons possessing ordinary skill in the art to which this invention pertains will appreciate that various modifications and enhancements may be made without departing from the spirit and scope of the claims that follow. For example, all illustrations depict an ergonomic mouse 101 adapted for use in the right hand. However, a left-handed mouse (built as a mirror-image of a right-handed mouse) is also a valid embodiment of the present invention.

I claim:

1. An ergonomic miniature mouse, the mouse in communication with a computer or instrument having a display screen, comprising:

a body, having a base surface for resting and sliding upon a work surface, the size of the body suited for gripping by a user's fingers like a writing implement while the user's hypothenar is in contact with the work surface;

a first side of the body, adjoining the base surface at an edge, the first side providing an area for the user's second finger to rest;

a second side of the body, adjoining the base surface at a second edge, the second side providing an area for the user's thumb to rest opposite the first side;

a facet on top of the body, providing an area for the user's first finger to rest;

a primary switch on the facet, adapted for activation by the user's first finger, such that activation of the primary switch corresponds to a selection on the display screen;

a secondary switch on the second side of the body, adapted for activation by the user's thumb in a pinching motion with the opposing second finger; and a relative motion sensor in the body, for translating movement of the mouse into corresponding movement of an object on the display screen.

2. An ergonomic miniature mouse as in claim 1, wherein the body is less than 33 cubic centimeters in volume.

3. An ergonomic miniature mouse as in claim 2, wherein the relative motion sensor is an optical sensor.

4. An ergonomic miniature mouse as in claim 3, wherein the facet is angled between approximately 30 to 70 degrees to the vertical.

5. An ergonomic miniature mouse as in claim 4, wherein the body is less than four centimeters wide.

6. An ergonomic miniature mouse as in claim 5, wherein the body is approximately 2.5 centimeters wide.

7. An ergonomic miniature mouse as in claim 1, wherein the mouse is built to be held in the right hand.

8. An ergonomic miniature mouse as in claim 1, wherein the mouse is built to be held in the left hand.

9. An ergonomic miniature mouse as in claim 1, wherein the ergonomic miniature mouse communicates with the computer via a wireless link.

10. An ergonomic miniature mouse as in claim 1 wherein the user's thumb, third, and fourth fingers contact the work surface while manipulating the mouse.

11. An ergonomic miniature mouse as in claim 10 wherein the second finger contacts the work surface.

12. An ergonomic miniature mouse as in claim 10, wherein the thumb and fingers may be cooperatively rolled against the work surface to nudge the mouse a minute distance.

13. An ergonomic miniature mouse as in claim 1 wherein the force required to activate the secondary switch is greater than the force required to activate the primary switch.

14. An ergonomic miniature mouse as in claim 13 wherein the force required to activate the secondary switch is more than 20% greater than the force required to activate the primary switch.

* * * * *